(12) United States Patent
Kim

(10) Patent No.: US 11,733,375 B2
(45) Date of Patent: Aug. 22, 2023

(54) APPARATUS AND METHOD FOR CONTROLLING RADAR

(71) Applicant: HL KLEMOVE CORP., Incheon (KR)

(72) Inventor: Woo Young Kim, Gyeonggi-do (KR)

(73) Assignee: HL KLEMOVE CORP., Incheon (KR)

(*) Notice: Subject to any disclaimer, the term of this patent is extended or adjusted under 35 U.S.C. 154(b) by 1143 days.

(21) Appl. No.: 16/241,847

(22) Filed: Jan. 7, 2019

(65) Prior Publication Data
US 2019/0212438 A1    Jul. 11, 2019

(30) Foreign Application Priority Data
Jan. 10, 2018 (KR) .......................... 10-2018-0003150

(51) Int. Cl.
*G01S 13/931* (2020.01)
*G01S 13/86* (2006.01)
(Continued)

(52) U.S. Cl.
CPC ............. *G01S 13/931* (2013.01); *G01S 7/411* (2013.01); *G01S 13/42* (2013.01); *G01S 13/867* (2013.01); *G06V 20/58* (2022.01); *H01Q 21/061* (2013.01)

(58) Field of Classification Search
CPC ........ G01S 13/931; G01S 7/411; G01S 13/42; G01S 13/424; G01S 13/726; G01S 7/02;
(Continued)

(56) References Cited

U.S. PATENT DOCUMENTS 8,902,103 B2 * 12/2014 Kim ..................... G01S 13/345
342/134
9,618,616 B2 * 4/2017 Kishigami ............... G01S 7/40
(Continued)

FOREIGN PATENT DOCUMENTS

CN          101313231        11/2008
CN          101430378         5/2009
(Continued)

OTHER PUBLICATIONS

Office Action dated Oct. 8, 2022 for Chinese Patent Application No. 201910024318.6 and its English translation from Global Dossier.
(Continued)

*Primary Examiner* — Peter M Bythrow
(74) *Attorney, Agent, or Firm* — Ladas & Parry, LLP

(57) ABSTRACT

Disclosed are an apparatus and a method for controlling a radar. More specifically, disclosed is a method of setting detection modes of a radar mounted to a vehicle and controlling radar transmission signals according to the detection modes. An embodiment provides an apparatus for controlling a radar including: a target detector configured to detect targets around a vehicle and classify the detected targets; a transmission pattern setter configured to set a transmission pattern of transmission signals, based on at least one piece of detection distance information of the detected targets, detection location information, detection height information, and information on a number of detected targets; and a transmission signal controller configured to select at least one array antenna from a plurality of array antennas according to the transmission pattern and radiate the transmission signals through the selected array antenna, a method thereof, and a system.

19 Claims, 16 Drawing Sheets

(51) Int. Cl.
*G01S 13/42* (2006.01)
*G01S 7/41* (2006.01)
*G06V 20/58* (2022.01)
*H01Q 21/06* (2006.01)

(58) Field of Classification Search
CPC ..... G01S 17/936; G01S 13/867; G06V 20/58; H01Q 21/061; B60W 2420/52
See application file for complete search history.

(56) References Cited

U.S. PATENT DOCUMENTS

| | | | | |
|---|---|---|---|---|
| 11,366,196 | B2* | 6/2022 | Kondo | H01Q 21/24 |
| 2005/0110673 | A1* | 5/2005 | Izumi | H01Q 25/002 |
| | | | | 342/107 |
| 2005/0237250 | A1* | 10/2005 | Mende | G01S 13/931 |
| | | | | 343/754 |
| 2008/0266169 | A1* | 10/2008 | Akita | B60W 40/04 |
| | | | | 342/117 |
| 2009/0121916 | A1 | 5/2009 | Miyake | |
| 2011/0234448 | A1* | 9/2011 | Hayase | G01S 13/931 |
| | | | | 342/70 |
| 2015/0160066 | A1 | 6/2015 | Sai | |
| 2015/0314785 | A1 | 11/2015 | Kwon | |
| 2015/0369904 | A1 | 12/2015 | Heo et al. | |
| 2016/0033632 | A1 | 2/2016 | Searcy et al. | |
| 2016/0178739 | A1 | 6/2016 | Lee | |
| 2017/0276770 | A1* | 9/2017 | Lin | H01Q 25/002 |
| 2018/0052230 | A1* | 2/2018 | Hirai | G01S 13/426 |

FOREIGN PATENT DOCUMENTS

| | | |
|---|---|---|
| CN | 105044690 | 11/2015 |
| CN | 105717507 | 6/2016 |
| CN | 105793677 | 7/2016 |
| CN | 106571536 | 4/2017 |
| JP | 2006-521536 | 9/2006 |
| JP | 2013-57584 | 3/2013 |
| JP | 5602275 | 10/2014 |
| JP | 2017-146100 | 8/2017 |
| KR | 10-2000-0069850 | 11/2000 |
| KR | 10-1137088 | 4/2012 |
| KR | 10-2013-0064254 | 6/2013 |
| KR | 10-1658470 | 9/2016 |
| KR | 20180060341 A * | 11/2016 |
| KR | 10-2017-0036350 | 4/2017 |
| WO | 2007/057474 | 5/2007 |
| WO | 2011/106881 | 9/2011 |

OTHER PUBLICATIONS

Office Action dated Aug. 21, 2019 for Korean Application No. 10-2018-0003150 and its English machine translation by Google Translate.
Engin Hyun et al., "Multi-Target Detection Algorithm for FMCW Radar", 2012 IEEE Radar Conference, 2012, pp. 338-341.
Office Action dated Jan. 14, 2020 for Korean Patent Application No. 10-2018-0003150 and its English translation by Google Translate.
Notice of Allowance dated Jun. 23, 2020 for Korean Application No. 10-2018-0003150 and its English machine translation by Google Translate.

* cited by examiner

400

APPARATUS AND METHOD FOR CONTROLLING RADAR

CROSS REFERENCE TO RELATED APPLICATION

This application claims priority from Korean Patent Application No. 10-2018-0003150, filed on Jan. 10, 2018, which is hereby incorporated by reference for all purposes as if fully set forth herein.

BACKGROUND OF THE INVENTION

1. Field of the Invention

The present disclosure relates to an apparatus and a method for controlling a radar.

2. Description of the Prior Art

Recently, as interest in safety and driver convenience has increased, various technologies for vehicle safety and convenience using vehicle radar devices have been developed. For example, various technologies, such as smart cruise technology, autonomous driving technology, and autonomous emergency braking technology, to detect a preceding vehicle and autonomously follow the detected preceding vehicle are being developed.

The vehicle radar device is a device for transmitting a signal and then detecting surroundings based on the signal reflected from an object, and a small size and a detection performance thereof are highlighted as important technical issues. Particularly, according to rapid increases in demands for autonomous vehicles, a need to develop technology for radar devices for detecting and determining surrounding objects is increasing.

A vehicle radar device is required to have a function of accurately detecting an object located in a long detection distance and also a function of accurately sensing a wide range in a short detection distance. This is because to detect not only an appropriate distance according to a speed of a preceding vehicle but also a target, such as a pedestrian suddenly appearing in a short range.

Further, the use of information on a target height has increased and a need for a method of detecting the same also has increased.

SUMMARY OF THE INVENTION

According to the background, the present disclosure proposes an apparatus and a method for controlling a radar which dynamically set the radar control operation according to surroundings.

Further, the present disclosure proposes the operation of controlling a radar device to guarantee vehicle safety and perform more accurate target detection as needed.

In accordance with an aspect of the present disclosure, apparatus for controlling a radar is provided. The apparatus for controlling a radar includes: a target detector configured to detect targets around a vehicle and classify the detected targets; a transmission pattern setter configured to set a transmission pattern of transmission signals based on at least one piece of detection distance information of the detected targets, detection location information, detection height information, or information on the number of detected targets; and a transmission signal controller configured to select at least one array antenna from a plurality of array antennas according to the transmission pattern and radiate the transmission signals through the selected array antenna.

In accordance with another aspect of the present disclosure, a method of controlling a radar is provided. The method of controlling a radar includes: detecting targets around a vehicle and classifying the detected targets; setting a transmission pattern of transmission signals based on at least one piece of detection distance information of the detected targets, detection location information, detection height information, or information on the number of detected targets; and selecting at least one array antenna from a plurality of array antennas according to the transmission pattern and radiating the transmission signals through the selected array antenna.

In accordance with another aspect of the present disclosure, a system for controlling a radar is provided. The system for controlling a radar includes: at least one radar sensor mounted to a vehicle to have an sensing area of an interior or an exterior of the vehicle and configured to capture sensing data; at least one driver assistance system controller mounted to the vehicle and configured to output a control signal for performing a driving assistance function; and a domain controller configured to process the sensing data and control the at least one driver assistance system controller, wherein the domain controller detect targets around the vehicle using the sensing data and classify the detected targets, set a transmission pattern of transmission signals based on at least one piece of detection distance information of the detected targets, detection location information, detection height information, or information on the number of detected targets, and select at least one array antenna from a plurality of array antennas according to the transmission pattern and control the radar sensor to radiate the transmission signals through the selected array antenna.

As described above, the present disclosure provides an effect of dynamically controlling the radar operation according to surroundings of the vehicle.

Further, the present disclosure has an effect of improving the radar detection performance and preventing unnecessary power waste by dynamically controlling the radar device as needed.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
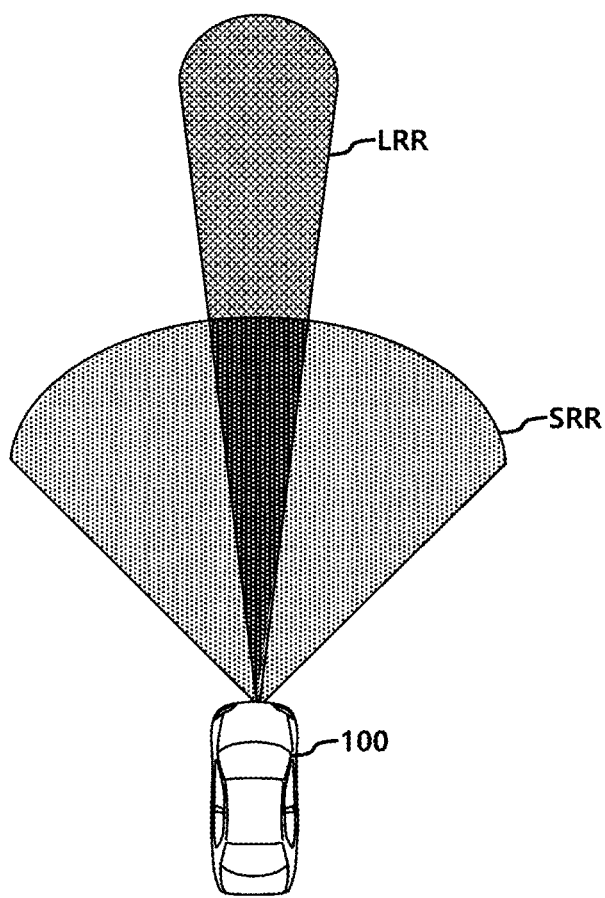
FIG. 1 illustrates a detection distance and a detection angle based on a detection mode according to an embodiment.

Hereinafter, embodiments of the present disclosure will be described in detail with reference to the accompanying drawings. In the description of the elements of the present disclosure, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

In this specification, an apparatus for controlling a radar is a device for controlling a radar device that detects a target based on a reception signal generated by a transmission signal reflected and received from an object, and corresponds to a control unit for controlling an operation of the radar. The radar device is mainly described as a device mounted to a vehicle, but is not limited thereto, and the description may be applied various radar devices such as a military radar device and a commercial radar device.

Detection modes described hereinafter may be divided according to a distance and an angle at which a target can be detected, and may be divided into a long-range detection mode for detecting a long-range object, a middle-range detection mode for detecting a middle-range object, and a short-range detection mode for detecting a short-range object. For example, the long-range detection mode is a mode in which a narrow detection area is formed due to signal synthesis as transmission signals are radiated through a plurality of array antennas but even a long-range object can be detected because of a high antenna gain. In another example, the middle-range detection mode and the short-range detection mode are modes in which a detection angle becomes wider but a detection distance becomes shorter as transmission signals are radiated through a smaller number of antennas than those in the long-range detection mode. That is, in respective detection modes, the detection distance and the detection angle vary depending on beam patterns of the transmission signals, and may be variously set according to the number and locations of array antennas. The number of detection modes may be variously implemented according to an advance setting, and the three detection modes, such as the long-range, middle-range, and short-range detection modes are described by way of examples for convenience of description in this specification, but are not limited thereto.

For example, the detection modes in this specification may be divided according to a vertical detection angle perpendicular to the ground. Alternatively, the detection modes may be divided according to a combination of at least one of the detection distance, a horizontal detection angle, or the vertical detection angle.

Meanwhile, a transmission pattern is a pattern in which the detection modes are repeated to indicate sequences of the detection modes arranged on the basis a time axis. For example, sequential radiation of a transmission signal for short-range detection, a transmission signal for middle-range detection, and a transmission signal for long-range detection will be described as one transmission pattern. Similarly, sequential radiation of a transmission signal for short-range detection, a transmission signal for middle-range detection, and a transmission signal for short-range detection again, without radiation of a transmission signal for long-range detection, will be described as another transmission pattern. As described above, the transmission pattern may be variously set according to sequences and frequencies of detection modes, and whether a particular detection mode is omitted, and some transmission patterns will be mainly described hereinafter but are not limited thereto. That is, the transmission patterns may be variously preset and used according to settings. Alternatively, the transmission patterns may be dynamically determined according to target detection and classification result.

Meanwhile, the radar sensor, the radar system, or the radar device used in the present disclosure may include at least one radar sensor, for example, one or more of a front detection radar sensor mounted to the front of the vehicle, a rear radar sensor mounted to the rear of the vehicle, or a side or a rear-side detection radar sensor mounted to each side of the vehicle. The radar sensor or the radar system may process data by analyzing a transmission signal and a reception signal and detect information on an object according to the processed data, and may include an Electronic Control Unit (ECU) or a processor therefor. Data transmission or signal communication from the radar sensor to the ECU may be performed through a communication link such as an appropriate vehicle network bus.

The radar sensor includes one or more transmission antennas for transmitting radar signals and one or more reception antennas for receiving signals reflected from an object.

Meanwhile, the radar sensor according to the present embodiment may adopt a multi-dimensional antenna array and a signal Multiple-Input Multiple-Output (MIMO) transmission/reception scheme in order to form a virtual antenna aperture larger than an actual antenna aperture.

For example, a two-dimensional antenna array is used to achieve horizontal and vertical angular accuracy and resolution. Through the two-dimensional radar antenna array, signals are transmitted/received by two individual horizontal and vertical scans (temporally multiplied), and MIMO may be used separately from the two-dimensional radar horizontal and vertical scans (temporally multiplied).

More specifically, the radar sensor according to the present embodiment may adopt a two-dimensional antenna array consisting of a transmission antenna unit including a total of 12 transmission antennas (Tx) and a reception antenna unit including 16 reception antennas (Rx), and as a result, may have a total of 192 virtual reception antenna arrangements.

The transmission antenna unit includes 3 transmission antenna groups, each of which includes 4 transmission antennas, wherein a first transmission antenna group may be vertically spaced apart from a second transmission antenna group by a predetermined distance and the first or second transmission antenna group may be horizontally spaced apart from a third transmission antenna group by a predetermined distance (D).

Further, the reception antenna unit may include 4 reception antenna groups, each of which includes 4 reception antennas, wherein the reception antenna groups may be vertically spaced apart from each other, and the reception antenna unit may be disposed between the first transmission antenna group and the third transmission antenna group, which are horizontally spaced apart from each other.

According to another embodiment, the antennas of the radar sensor are disposed in a two-dimensional antenna array. For example, each antenna patch is arranged in the shape of a rhombus, and thus the number of unnecessary side lobes may be reduced.

Alternatively, the two-dimensional antenna array may include a V-shaped antenna array in which a plurality of radial patches is disposed in a V shape, and, more particularly, may include two V-shaped antenna arrays. At this time, signal feeding may be performed at the apex of each V-shaped antenna array.

Alternatively, the two-dimensional antenna array may include an X-shaped antenna array, in which a plurality of radial patches is disposed in an X shape, and, more particularly, may include two X-shaped antenna arrays. At this time, signal feeding may be performed at the center of each X-shaped antenna array.

Further, the radar sensor according to the present embodiment may use a MIMO antenna system in order to implement accurate detection and resolution vertically and horizontally.

More specifically, in the MIMO system, respective transmission antennas may transmit signals having independent waveforms distinguished from each other. That is, each transmission antenna may transmit a signal having an independent waveform distinguished from those of other transmission antennas, and each reception antenna may identify which transmission antenna transmitted a reflected signal which is reflected from an object due to the different waveforms of the signals.

Further, the radar sensor according to the present embodiment may include a radar housing for accommodating a circuit and a substrate including transmission/reception antennas and a radome for configuring the exterior of the radar housing. At this time, the radome is formed with a material which can reduce attenuation of a transmitted/received radar signal, and may constitute a front/rear bumper of the vehicle, a grille, a side frame, or the exterior surface of components of the vehicle.

That is, the radome of the radar sensor may be disposed inside a vehicle grille, a bumper, or a frame. When the radar sensor is disposed as a part of the components constituting the exterior surface of the vehicle, such as the vehicle grille, the bumper, and part of the frame, it is possible to increase the aesthetic appearance of the vehicle and provide convenience in mounting the radar sensor.

Hereinafter, an apparatus and a method for controlling a radar according to the present disclosure will be described with reference to drawings. In the following description, the detection modes are divided according to a detection distance and a detection angle, but the present disclosure may be applied to the case in which the detection modes are divided according to the vertical detection angle on the ground as described above.

FIG. 1 illustrates the detection distance and the detection angle based on the detection mode according to an embodiment.

Referring to FIG. 1, a vehicle 100 may detect objects around the vehicle through a radar device. The vehicle 100 is required to detect objects near the vehicle and also detect other vehicle ahead in a long distance. This is because a driver assistance system provided by the vehicle 100 needs to detect various objects. For example, in order to control the vehicle 100 to follow another preceding vehicle through a smart cruise function, it is required to continuously detect another particular vehicle in a long distance. Unlike this, in order to detect entry of a pedestrian or entry of another vehicle traveling in an adjacent lane due to a lane change, it is required to detect a short-range area of the vehicle 100 at a wide angle.

According to such a need, the vehicle 100 requires both a Long-Range Radar (LRR) and a Short-Range Radar (SRR). The vehicle 100 may implement the LRR and the SRR as separate radar devices but may configure one radar device to operate as one of the LRR and the SRR according to the detection mode in light of cost and efficiency. Hereinafter, the long-range mode is referred to as the LRR, the short-range mode is referred to as the SRR, and the middle-range mode is referred to as a middle-range radar, but the terms are not limited thereto. The long range, middle range, and short range are divided according to a preset distance reference and the terms may be more subdivided according to the number of detection modes.

As illustrated in FIG. 1, the LRR indicates a narrower beam width but has a longer distance compared to the SRR. Similarly, the SRR may detect an area at a wider angle around vehicle but has a lower antenna gain and thus has a shorter detection distance compared to the LRR.

Figure 2:
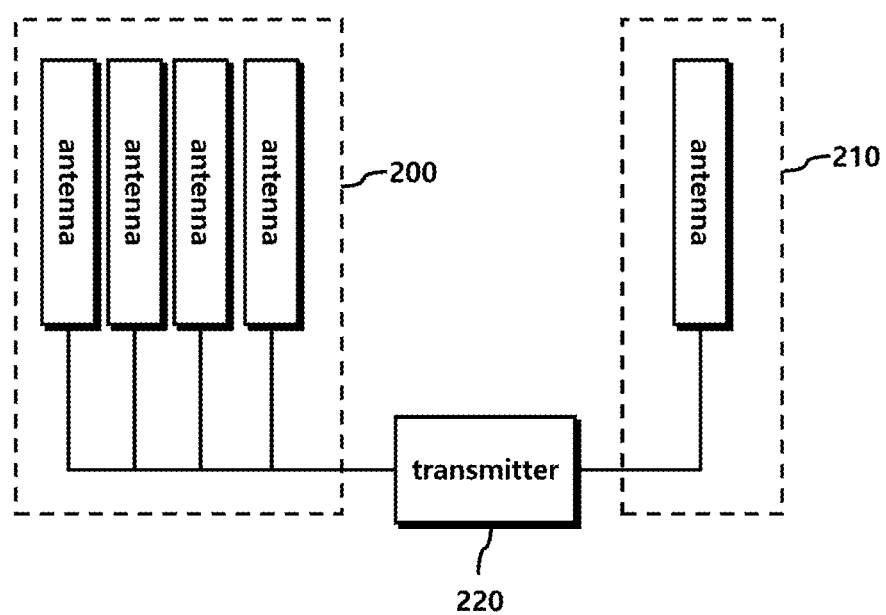
FIG. 2 illustrates the configuration of antennas based on a detection mode according to an embodiment.

FIG. 2 illustrates the configuration of antennas based on the detection mode according to an embodiment.

Referring to FIG. 2, the radar device to which the present disclosure can be applied may include a transmitter 220 and a plurality of antennas. The radar device may further include a receiver for receiving a reflected signal of the transmission signal and a control device for controlling the radar operation.

When the radar device radiates the transmission signal to the LRR, the plurality of antennas 200 may radiate the transmission signal. For example, when the transmitter 220 transfers and radiates a preset transmission signal to the plurality of antennas, the signals radiated from the plurality of antennas may be combined and thus have an LRR characteristic.

Unlike this, when the radar device radiates the transmission signal to the SRR, a single antenna or a smaller number of antennas 210 compared to the LRR may radiate the transmission signal. In this case, a combination between radiated signals is not generated, and thus the detection angle becomes wider but the detection distance according to the antenna gain becomes shorter.

Figure 3:
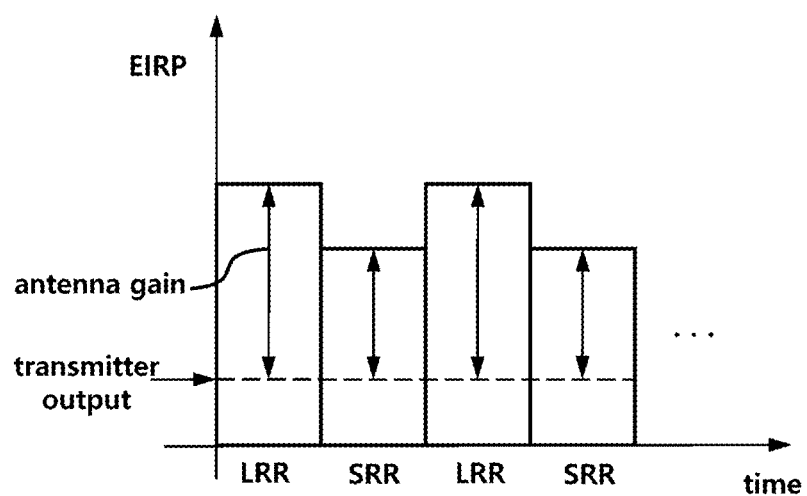
FIG. 3 illustrates a pattern in which transmission signals are radiated in periodically changed detection modes according to an embodiment.

FIG. 3 illustrates a pattern in which transmission signals are radiated in periodically changed detection modes according to an embodiment.

Referring to FIG. 3, the conventional radar device providing the LRR and the SRR radiates the transmission signal alternately in two types. For example, the radar device periodically transmits the LRR and the SRR and receives reflected signal thereof, so as to detect targets. When the antenna device is configured as illustrated in FIG. 2, transmitter output power, which is output from the transmitter, is equally applied but Effective Isotropic Radiated Power (EIRP) of the LRR and the SRR is different according to an antenna gain, so that a detection distance and a detection angle are different. EIRP denotes a product of power of the transmitter supplied to an antenna and an absolute gain of an isotropic antenna.

Such an operation has a problem in that the dynamic detection result that fits the need of the vehicle cannot be acquired since a long-range object and a short-range object are detected according to the same period. For example, even when there is no target in a long rang, the LRR mode is applied according to the same period, so that unnecessary energy consumption is made and it is difficult to increase the performance of detection of the short-range object.

The present disclosure relates to an adaptive apparatus and method for controlling a radar to solve the problem and provide an effect of increasing the detection performance and preventing unnecessary energy consumption by dynamically setting the detection mode.

Figure 4:
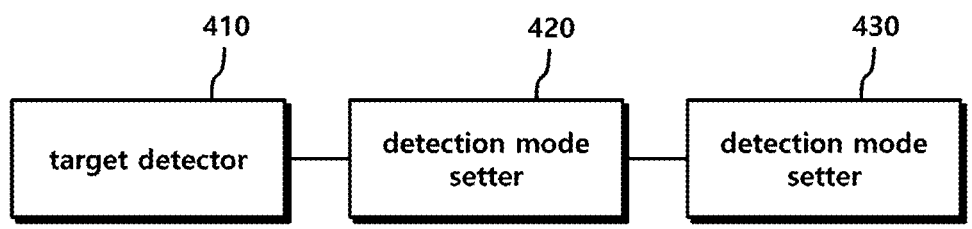
FIG. 4 illustrates the configuration of an apparatus for controlling a radar according to an embodiment.
Figure 5:
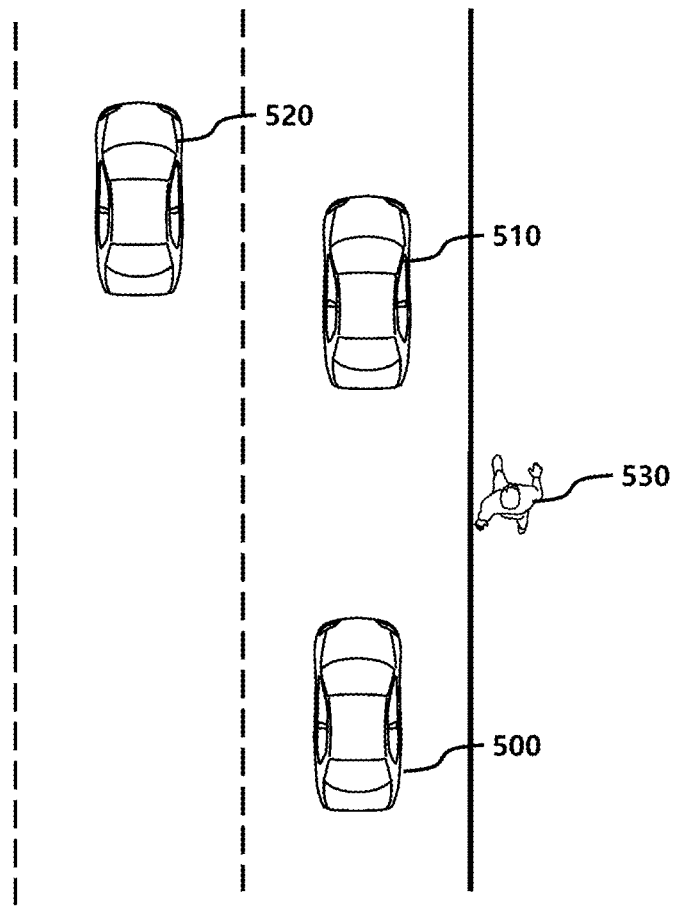
FIG. 5 illustrates the operation for dividing targets according to an embodiment.

FIG. 4 illustrates the configuration of an apparatus for controlling a radar according to an embodiment.

Referring to FIG. 4, an apparatus for controlling a radar 400 may include a target detector 410 configured to detect targets around the vehicle and classify the detected targets, a transmission pattern setter 420 configured to set a transmission pattern of transmission signals based on at least one piece of detection distance information of the detected targets, detection location information, detection height information, and the number of detected targets, and a transmission signal controller 430 configured to select at least one array antenna from a plurality of array antennas according to the transmission pattern and control the transmission signals to be radiated through the selected array antenna.

The target detector 410 may classify the detected targets into a control target for control of the vehicle according to a control mode of the vehicle and a peripheral target. For example, when a vehicle 500 detects other vehicles 510 and 520 and a person 530, the target detector 410 may classify a control target and a peripheral target according to a preset reference. For example, when a smart cruise control function is activated in the vehicle 500, the vehicle 510 traveling in the same lane in which the vehicle 500 travels may be set as the control target and the vehicle 520 traveling in an adjacent lane and the person 530 may be set as the peripheral targets. Alternatively, the preceding vehicle 510 traveling in the same lane as the vehicle 500 may be classified as the control target and the vehicle 520 in the adjacent lane may be also classified as the control target when a control mode for detecting a vehicle in the adjacent lane having a possibility to change lanes is activated. Similarly, the person 530 may be also classified as the control target according to a control mode of the vehicle 500. Alternatively, the control target and the peripheral target may be classified according to a relative distance between the detected target and the vehicle 500. That is, a target detected with a preset reference distance may be classified as the control target and a target detected beyond the reference distance may be classified as the peripheral target. Alternatively, the targets may be classified in consideration of both the control mode of the vehicle and the relative distance. The classified targets may be used as elements for determining the transmission pattern.

Hereinafter, respective references for determining transmission pattern will be individually described. The respective references may be independently applied or a combination thereof may be applied.

For example, the transmission pattern setter 420 may determine a maximum detect distance from the detection distance between each of the detected targets and the vehicle and may set a transmission pattern corresponding to the maximum detection distance.

Figure 6:
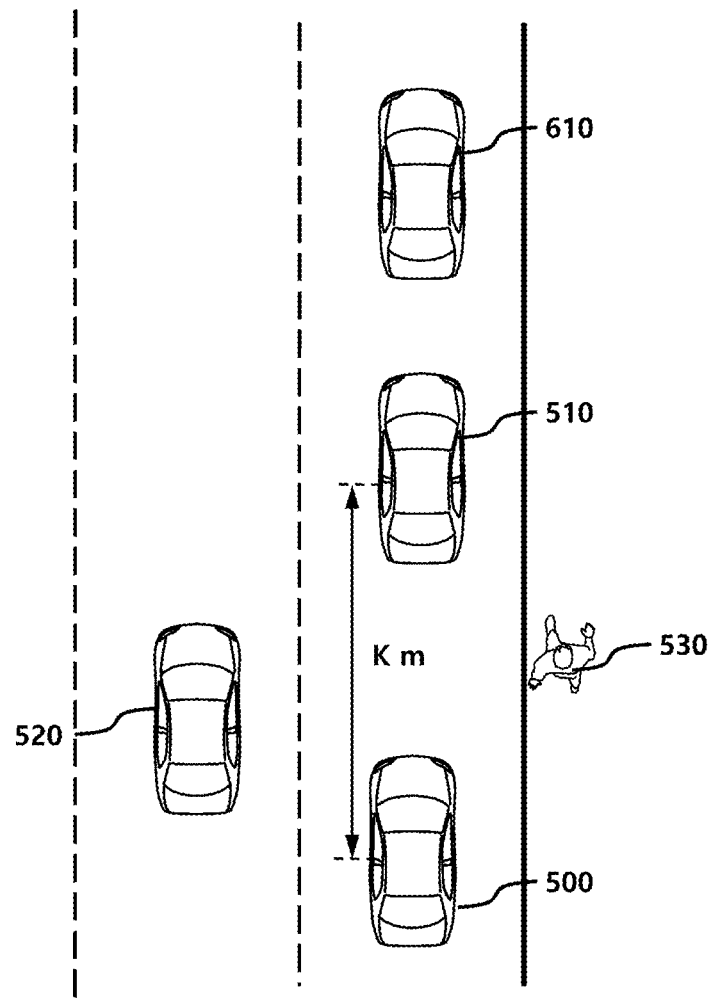
FIG. 6 illustrates the operation of setting a transmission pattern according to an embodiment.

Referring to FIG. 6, the transmission pattern setter 420 may determine relative distances between the vehicle 500, and other vehicles 510, 520, and 610 and the person 530. The relative distance may be determined based on the center of each target and the center of the vehicle 500 or determined based on the shortest distance. That is, the relative distance may be variously determined according to the calculation reference and there is no limit thereon.

Alternatively, when the control target and the peripheral target are classified as described above, the transmission pattern may be determined using detection distances from control targets except for the peripheral target. For example, the preceding vehicle 510 traveling in the same lane as the vehicle 500, the vehicle 520 in the adjacent lane, and the person 530 may be classified as the control targets, and the preceding vehicle 610, which travels in the same lane as the vehicle 500 but has another vehicle 510 therebetween, may be classified as the peripheral target. In this case, the transmission pattern setter 420 may set the transmission pattern based on a maximum detection distance (K m) having the longest detection distance (K m) in information on detection distances from the control targets, that is, the vehicles 510 and 520 and the person 530.

Unlike this, the transmission pattern setter 420 may determine information on detection distances from all the detected targets and set the transmission pattern based on maximum detection distance information having the largest value (in this case, relative distance information between the vehicles 500 and 610).

In another example, the transmission pattern setter 420 may determine a maximum angle at which the detected targets are distributed from the vehicle based on detection location information and set a transmission pattern corresponding to the maximum angle. Referring back to FIG. 6, when the detected targets are only the vehicles 510 and 610, the transmission pattern setter 420 may continuously detect the targets through a transmission signal having a narrow detection area alone, and thus may set the corresponding transmission pattern. Unlike this, when the detected targets are the vehicles 510, 520, and 610, and the person 530, the transmission pattern setter 420 may set a transmission pattern including a detection mode having a wide detection range to monitor the targets 520 and 530.

Meanwhile, as described above, based on the result of classification of the control target and the peripheral target, the transmission pattern setter 420 may determine the transmission pattern by calculating an angle based on the control target.

In another example, the transmission pattern setter 420 may compare information on the number of detected targets with information on the preset reference number and set a transmission pattern corresponding to the comparison result. For example, when the number of detected targets is larger than the reference number, the transmission pattern setter 420 may set a transmission pattern including various detection modes in order to monitor a larger number of targets. Unlike this, when the number of targets is equal to or smaller than the reference number, the transmission pattern setter 420 may set a transmission pattern in which a particular detection mode frequently appears according to the number of corresponding targets and locations of the targets. Alternatively, the transmission pattern setter 420 may set a transmission pattern in which a particular detection mode frequently appears based on the number of targets in each distance section which can be detected in each detection mode. For example, when three short-range targets 510, 520, and 530 are determined and one middle-range target 610 is determined, a transmission pattern including only the SRR and the MRR may be set. Alternatively, the transmission pattern setter 420 may set a transmission pattern in which the frequency of the SRR is higher compared to the MRR and the LRR.

As described above, the apparatus for controlling the radar according to the present disclosure may control the radar by setting various transmission patterns based on an environment around the vehicle. Accordingly, it is possible to dynamically set the radar detection distance and detection angle suitable for the environment around the vehicle and thus prevent unnecessary energy waste, and to shorten a detection cycle for a required area and thus provide more accurate detection performance.

Meanwhile, the transmission pattern setter 420 may set a reference pattern according to a preset period. The reference pattern is a transmission pattern including a plurality of detection mode, each of which appears once and may be periodically set and radiated in order to perform initial target detection for target classification and to detect a target change. The period of the reference pattern may be predetermined according to an experiment and vehicle settings or set according to manipulation by the user.

Further, the transmission pattern may include a plurality of detection modes divided according to the distance and angle within which the target can be detected. Further, the transmission pattern may be set based on at least one of sequences in which the plurality of detection modes are set or a frequency in which each of the plurality of detection modes is set. The detection modes may be divided into the LRR, the MRR, and the SRR as described above, but are not limited thereto. For example, the LRR may be classified based on the detection distance up to 200 m, the MRR may be classified based on the detection distance up to 120 m, and the SRR may be classified based on the detection distance up to 60 m. Alternatively, the detection modes may be divided according to detection angles thereof.

Hereinafter, the transmission pattern set by the transmission pattern setter 420 will be described by way of an example with reference to drawings. The following transmission patterns are only examples and other various transmission patterns may be set according to transmission pattern configuration information configured in advance. Further, each transmission pattern may be stored in advance to correspond to a transmission pattern setting reference.

Figure 7:
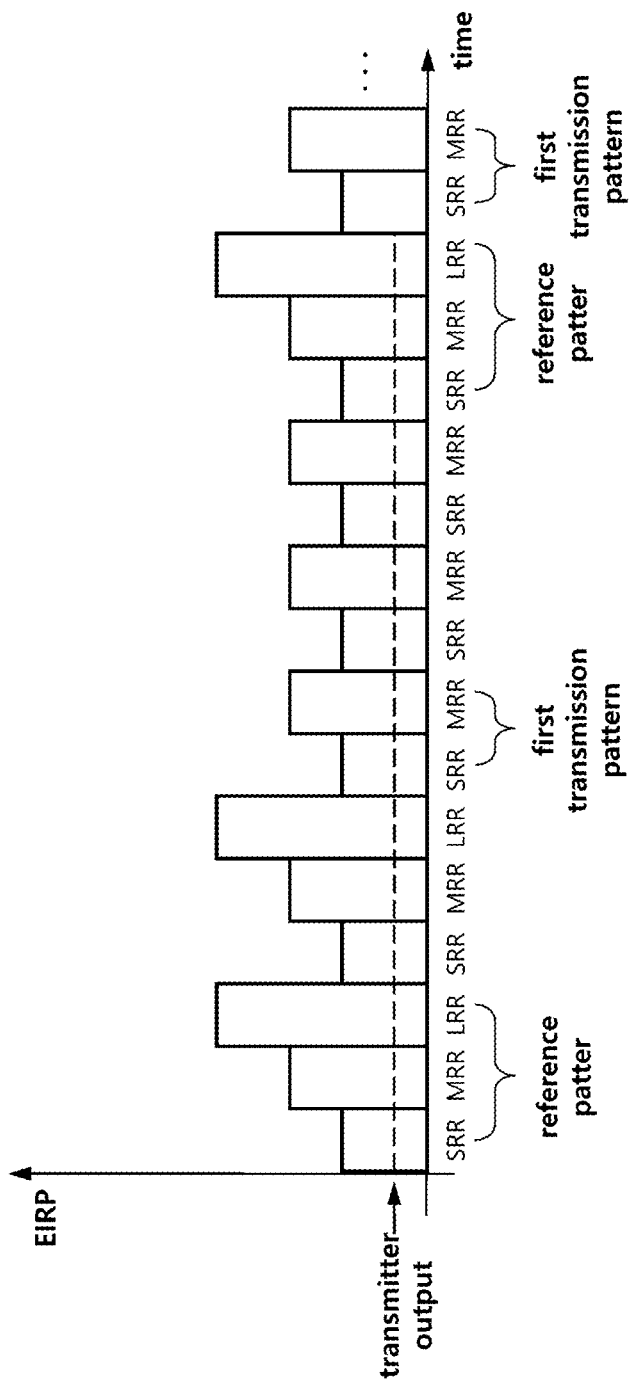
FIG. 7 illustrates an example of setting a transmission pattern when no long-range target is detected according to an embodiment.

FIG. 7 illustrates an example of setting the transmission pattern when no long-range target is detected according to an embodiment.

Referring to FIG. 7, the transmission pattern setter 420 may set a transmission pattern in which a detection mode for detecting a long-range target is omitted based on at least one piece of maximum detection distance information, target location information, and information on the number of targets. For example, the transmission pattern setter 420 may set a reference pattern in order to initial target detection or according to a reference pattern period and then identify there is no long-range target or control target in targets detected according to the reference pattern. In this case, the transmission pattern setter 420 may change the reference pattern into a first transmission pattern. The first transmission pattern may include only the SRR and the MRR except for the LRR detection mode. The first transmission pattern is repeatedly applied a predetermined number of times, at a predetermined time, or according to a predetermined period, and the reference pattern may be set again according the reference pattern period. When the transmission pattern is set as the reference pattern and the transmission signal is transmitted, if no long-range target is detected, the transmission pattern setter 420 may change the transmission pattern to the first transmission pattern again.

Through the transmission pattern, it is possible to efficiently use radar signals and deal with unexpected situations by not transmitting radiation signal for detecting long-range targets for a predetermined time and more frequently transmitting short-range and middle-range signals in an environment such as an expressway through which few vehicles pass.

Figure 8:
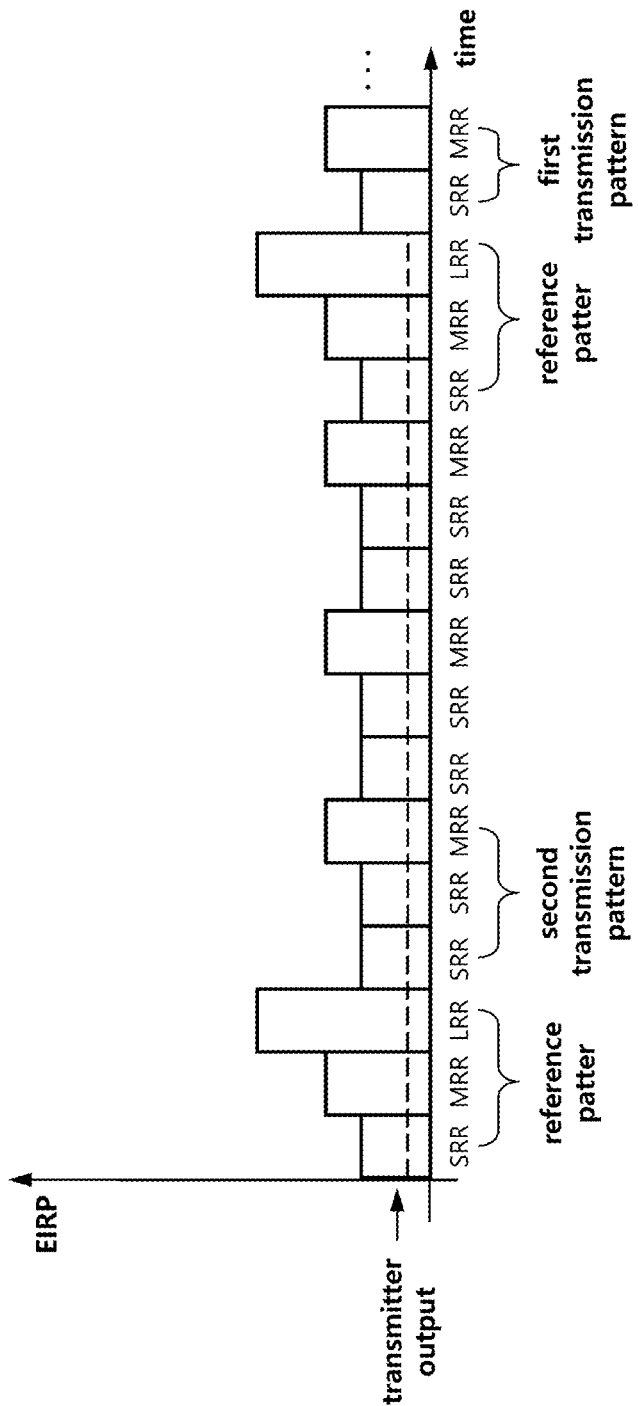
FIG. 8 illustrates an example of setting a transmission pattern when a short-range target is detected according to an embodiment.

FIG. 8 illustrates an example of setting a transmission pattern when a short-range target is detected according to an embodiment.

Referring to FIG. 8, the transmission pattern setter 420 may set a reference pattern in order to perform initial target detection or according to a reference pattern period and then set a transmission pattern based on targets detected according to the reference pattern and classified target information. For example, when three short-range control targets are detected, one middle-range target is detected, and no long-range control target is detected as illustrated in FIG. 6, the transmission pattern setter 420 may set a transmission pattern for improving the performance of detection of short-range targets. That is, when the target detection and classification are completed according to the reference pattern, a second transmission pattern corresponding to the number of short-range targets may be set. The second transmission pattern may be set as a pattern including the SRR detection modes two times successively on the time axis and the MRR detection mode one time. In the case of LRR, there is no long-range control target, the transmission patterns may be set without the LRR detection mode as illustrated in FIG. 7. Alternatively, the LRR detection mode may be included one time.

The second transmission pattern is repeatedly applied a predetermined number of times, at a predetermined time, or according to a predetermined period, and the reference pattern may be set again according the reference pattern period. When the transmission pattern is set as the reference pattern and the transmission signal is radiated, if the number of short-range targets is reduced, the transmission pattern setter 420 may change the transmission pattern to the first transmission pattern.

Figure 9:
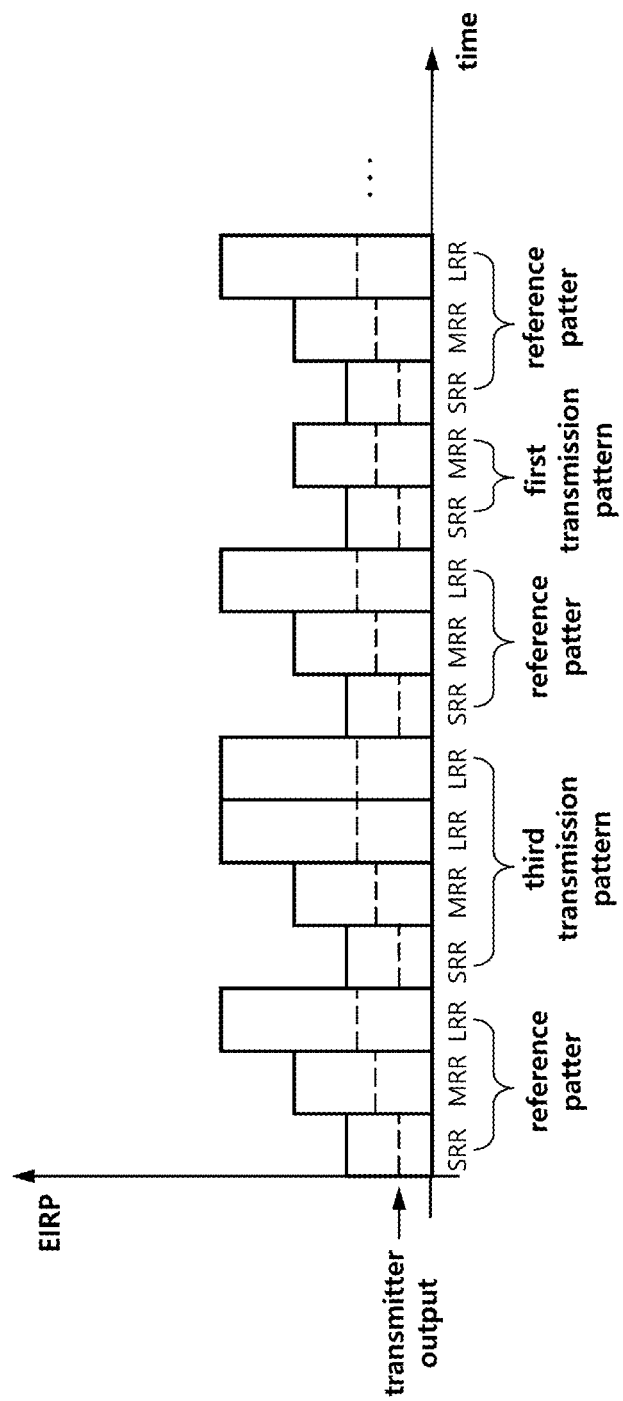
FIG. 9 illustrates an example of setting a transmission pattern when the long-range target is detected according to an embodiment.

FIG. 9 illustrates an example of setting the transmission pattern when the long-range target is detected according to an embodiment.

Referring to FIG. 9, the transmission pattern setter 420 may change the transmission pattern according to a detection result of the received targets set in the reference pattern. For example, when the number of long-range targets is larger than or equal to a reference number or when maximum detection distance information is selected based on the long-range target, a third transmission pattern for increasing the performance of detection of the long-range target may be set. The third transmission pattern is set to include the LRR detection mode two times and thus the long-range target can be monitored in great detail.

Meanwhile, as described above, the reference pattern may be set according to a preset period. FIG. 9 illustrates an example in which one transmission pattern is set as a reference pattern period. That is, the transmission pattern setter 420 may set the reference pattern, set the third transmission pattern, and then set the reference pattern again. As each reference pattern is set and then the next transmission pattern is set using detected targets by the reference pattern, the transmission pattern may be changed after the reference pattern is set as illustrated in FIG. 9.

As described above, the transmission pattern may be variously set, and the configuration of detection modes included in each transmission pattern may vary depending on an environment around the vehicle and user's input. For example, a plurality of transmission patterns may be pre-stored according to settings and a transmission pattern corresponding to a reference may be selected based on a preset table according to the settings of the transmission pattern setter 420. Although only some of the transmission patterns have been described by way of an example, the present disclosure is not limited thereto and a plurality of transmission patterns may be stored according to various configurations.

Figure 10:
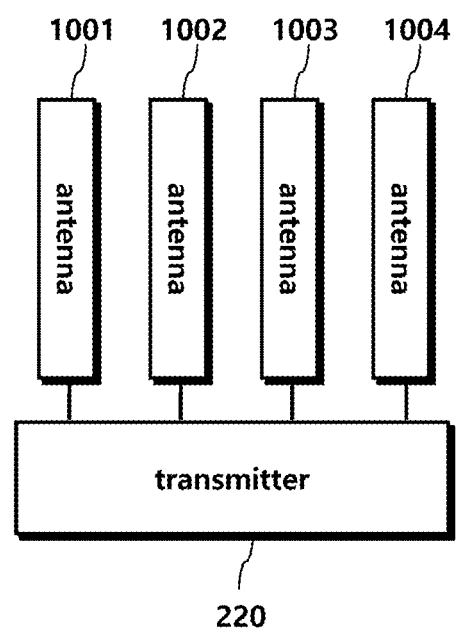
FIG. 10 illustrates the operation of selecting antennas for radiating transmission signals according to an embodiment.

FIG. 10 illustrates an operation of selecting antennas for radiating transmission signals according to an embodiment.

Meanwhile, the transmission signal controller 430 may control radiation of transmission signals according to a transmission pattern set through the above-described method.

For example, the transmission signal controller 430 may select the number of array antennas through which transmission signals are radiated according to each detection mode. Specifically, the transmission signal controller 430 may identify detection modes included in the transmission pattern, identify the number of pre-stored array antennas corresponding to each detection mode, and select the number of corresponding array antennas as the number of antennas for radiating the transmission signals. For example, when the transmission pattern is set as the reference pattern, the transmission signal controller 430 may select one array antenna to transmit transmission signals in the SRR detection mode, select two antenna arrays to transmit transmission signals in the MRR detection mode, and select four array antennas to transmit transmission signals in the LRR detection mode. The number of antennas selected according to each detection mode may be preset but is not limited thereto.

When the number of array antennas to radiate transmission signals is larger, a detection distance according to an antenna gain becomes longer and a detection angle becomes narrower. Accordingly, when the SRR detection mode is set, the transmission signal controller 430 may select one antenna from among antennas 1001 to 1004 according to a preset reference and radiate transmission signals. Unlike this, when the LRR detection mode is set, the transmission signal controller 430 may select all the antennas 1001 to 1004 and radiate transmission signals.

Meanwhile, the radar device may be configured as illustrated in FIG. 2 or FIG. 10. When the radar device is configured as illustrated in FIG. 2, there is no transmission output change according to the detection mode as illustrated in FIGS. 7 and 8. That is, powers of the signals output from the transmitter are the same without distinction of detection modes. Unlike this, when the radar device is configured as illustrated in FIG. 10, the transmission outputs according to the detection modes may be differently set as illustrated in FIG. 9. For example, since one antenna is used in the SRR detection mode and four antennas are used in the LRR detection mode, the output of the transmitter is higher in the LRR detection mode compared to the SRR detection mode. This is caused according to whether each antenna is directly connected to the transmitter and whether each antenna is branched to one transmitter output line.

Meanwhile, in another example, the transmission signal controller 430 may differently select the number of array antennas according to detection modes included in the transmission pattern and select an index of the array antenna according to detection location information of the target. For example, when selecting one array antenna according to the SRR detection mode, the transmission signal controller 430 may select the antenna 1001 or 1002 and to radiate transmission signals if the target is located in the left of the vehicle from the vehicle. Unlike this, if the target is located in the right of the vehicle, the transmission signal controller 430 may select the antenna 1003 or 1004 and to radiate transmission signals. As described above, the transmission signal controller 430 may transmit radiation signal at an angle at which detection of the corresponding target is easier by selecting the index of the antenna based on the location of the target.

Similarly, when selecting the antenna according the MRR detection mode, the transmission signal controller 430 may select the antennas 1001 and 1003 and select the antennas 1002 and 1003 or the antennas 1001 and 1004. Therethrough, the transmission signal controller 430 may more minutely control the detection distance or the detection angle.

As described above, the radar device according to the present disclosure may dynamically set the transmission pattern according to the environment around the vehicle, select array antennas suitable for the detection modes included in the set transmission pattern, and radiate the transmission signals, so as to improve the radar performance dynamically corresponding to surroundings and environments.

Hereinafter, a method of controlling a radar by which all or some of the present embodiments can be implemented will be described with reference to drawings.

Figure 11:
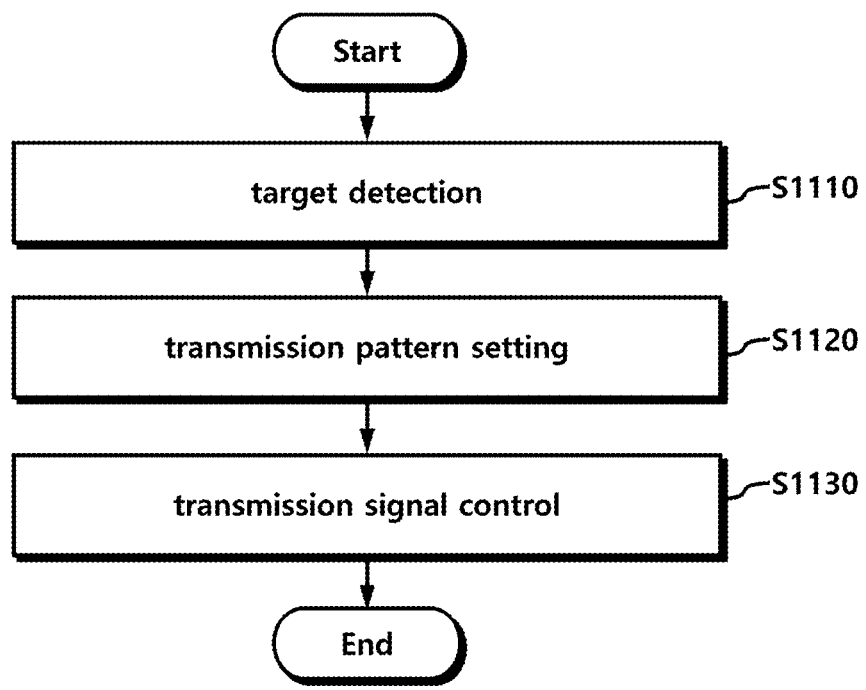
FIG. 11 is a flowchart illustrating a method of controlling a radar according to an embodiment.

FIG. 11 is a flowchart illustrating the method of controlling the radar according to an embodiment.

Referring to FIG. 11, the method of controlling the radar may include a target detection step of detecting targets around the vehicle and classifying the detected target in S1110. As described above, the target detection step may classify the detected targets into a control target for control of the vehicle and a peripheral target according to a control mode of the vehicle. For example, when a smart cruise control function is activated in the vehicle, a preceding vehicle traveling in the same lane as the vehicle may be set as the control target and a traveling in an adjacent lane and a person may be set as the peripheral target. Alternatively, the preceding vehicle traveling in the same lane as the vehicle may be classified as the control target and the vehicle in the adjacent lane may be also classified as the control target when a control mode for detecting a vehicle having a possibility to change lanes is activated. Alternatively, a target detected within a preset reference distance may be classified as the control target and a target detection beyond the reference distance may be classified as the peripheral target.

Further, the method of controlling the radar may include a transmission pattern setting step of setting a transmission pattern of transmission signals based on at least one piece of detection distance information of the detected targets, detection location information, detection height information, and information on the number of detected targets in S1120. For example, the transmission pattern setting step may select a maximum detection distance by calculating detection distance information between each of the detected targets and the vehicle and set a transmission pattern corresponding to the maximum detection distance. In another example, the transmission pattern setting step may determine a maximum angle within which the detected targets are distributed from the vehicle based on detection location information and set a transmission pattern corresponding to the maximum angle. In another example, the transmission pattern setting step may compare information on the number of detected targets with preset reference number information and set a transmission pattern corresponding to the comparison result. In still another example, the transmission pattern setting step may set a transmission pattern in which a particular detection mode frequently appears based on the number of targets in each distance section which can be detected in each detection mode.

Meanwhile, the transmission pattern setting step may set a reference pattern according to a preset period. The reference pattern is a transmission pattern including a plurality of detection modes, each of which appears once and may be periodically set and radiated in order to perform initial target detection for target classification and to detect a target change. The period of the reference pattern may be predetermined according to an experiment and vehicle settings or set according to manipulation by the user.

The method of controlling the radar may include a transmission signal control step may select at least one array antenna from a plurality of array antennas according to a transmission pattern and to radiate transmission signals through selected array antenna in S1130. For example, the transmission signal control step may select the number of array antennas through which transmission signals are radiated according to each detection mode Specifically, the transmission signal control step may identify detection modes included in the transmission pattern, identify the number of pre-stored array antennas corresponding to each detection mode, and select the number of corresponding array antennas as the number of antennas for radiating the transmission signals. In another example, the transmission signal control step may select the number of array antennas differently according to detection modes included in the transmission pattern and select an index of the array antenna according to detection location information of the vehicle.

In addition, the method of controlling the radar may include a step of performing the operations described stage-by-stage with reference to FIGS. 1 to 10 and some steps may be omitted or sequences thereof may be changed.

Figure 12:
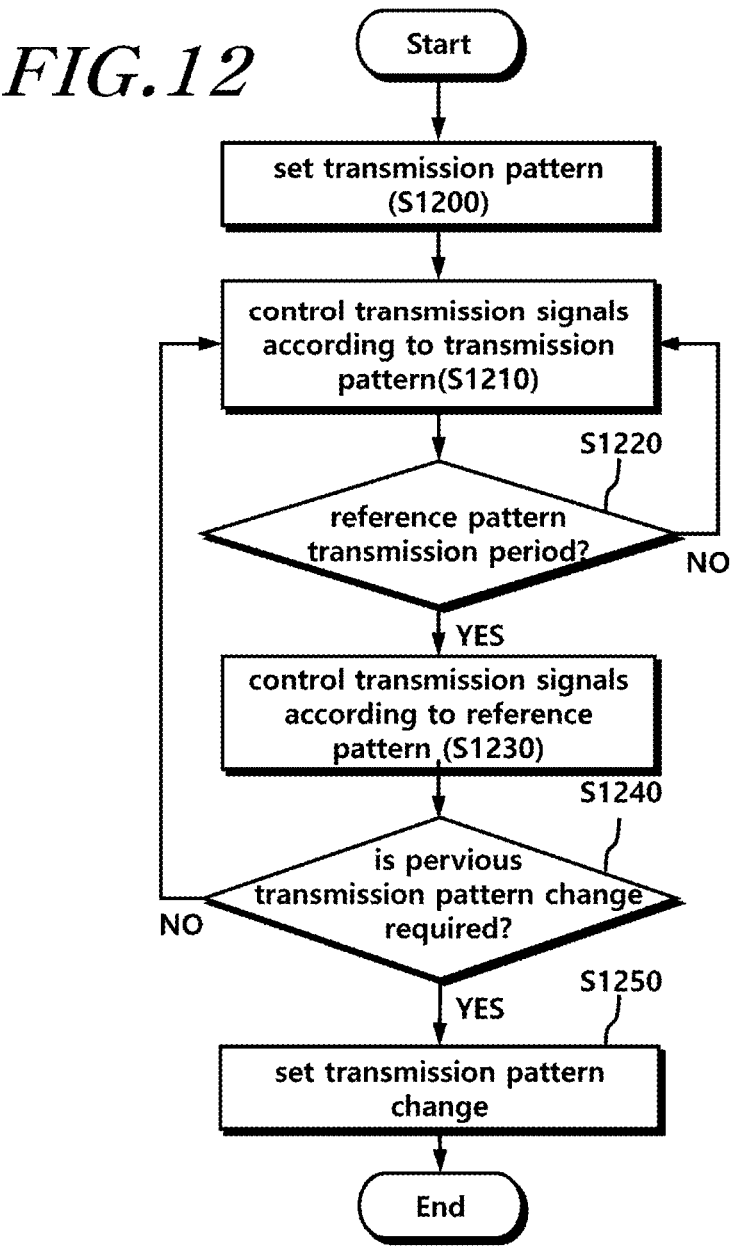
FIG. 12 is a flowchart illustrating a transmission pattern setting operation according to an embodiment.

FIG. 12 is a flowchart illustrating a transmission pattern setting operation according to an embodiment.

Referring to FIG. 12, the method of controlling the radar may include a transmission pattern setting step in S1200. The transmission pattern may be set based on at least one piece of information on a maximum detection distance from the target, target location information, and information on the number of targets. The transmission pattern may be preset according to each reference, and each transmission pattern may include a plurality of detection modes having different sequences and frequencies.

When the transmission pattern is set, the method of controlling the radar may select an antenna according to the set transmission pattern and radiate transmission signals in S1210. For example, the number of antennas and antenna indexes are selected according to each detection mode included in the transmission pattern and transmission signals may be radiated using the selected antennas. In this case, the output of the transmitter may be the same in each detection mode or may be set differentially.

The method of controlling the radar may identify if a reference pattern transmission period arrives in S1220. The reference pattern transmission period may be preset. When the reference pattern transmission period does not arrive, the control may be maintained to radiate the transmission signals according to a preset transmission pattern.

When the reference pattern transmission period arrives, the method of controlling the radar radiate the transmission signals according to the reference pattern in S1230. To this end, the method of controlling the radar may radiate the transmission signals in the detection mode included in the preset reference pattern.

Thereafter, the method of controlling the radar may determine whether a change in the transmission pattern before the reference pattern is needed by analyzing targets detected through the radiation of the transmission signals according to the reference pattern in S1240. This may be determined according to whether the radar device moves due to mobility thereof or a reference for changing the transmission pattern is changed according to movement of the target. For example, a transmissions pattern is set to include the SRR and the MRR since there is no long-range detection target, but if a long-range detection target is newly detected after a transmission signal is radiated in the LRR detection mode in the reference pattern, a change of the transmission pattern to a transmission pattern including the LRR detection mode may be needed. In contrast, there may be the case in which a previous transmission pattern should be maintained even though a new target is detected. For example, when one target is added to short-range targets, the existing transmission pattern set for the purpose of detecting short-range targets may be maintained.

When it is determined that there is no need to change the previous transmission pattern of the reference pattern, the transmission signals may be controlled according to the previous transmission pattern of the reference pattern in S1210. In contrast, when it is determined that the transmission pattern change is needed, the transmission pattern may be changed to a transmission pattern according to a transmission pattern setting reference in S1250.

Hereinafter, the case in which detection modes are divided according to the detection angle perpendicular to the ground will be described. In the following embodiment, the detection modes may be divided according to a combination of the detection distance and the horizontal detection angle.

Figure 13:
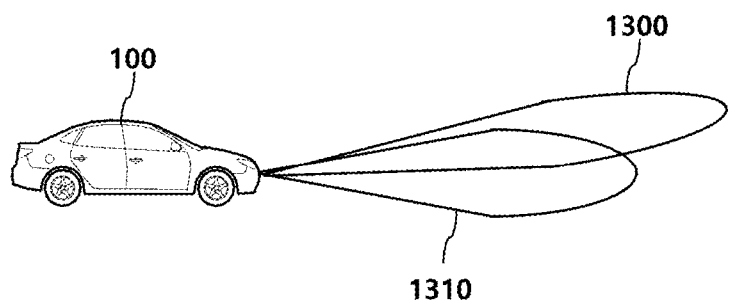
FIG. 13 illustrates a transmission signal radiation characteristic based on a transmission angle according to an embodiment.

FIG. 13 illustrates a transmission signal radiation characteristic based on a transmission angle according to an embodiment.

Referring to FIG. 13, the vehicle 100 may transmit transmission signals having different transmission angle in a direction perpendicular to the ground. For example, the apparatus for controlling the radar may radiate a transmission signal 1310 set to have an angle parallel to the ground and a transmission signal 1300 having a transmission angle different from that of the transmission signal 1310.

To this end, the transmission pattern setter may set a transmission pattern corresponding to detection height information based on detection height information of the detected targets. The transmission pattern may be set to include detection modes having different vertical detection angles.

For example, the transmission patterns may be set to include a plurality of detection modes divided based on transmission angles for detecting targets and may be divided based on at least one of sequences in which a plurality of detection modes is set or a frequency in which each of a plurality of detection modes is set.

The transmission signal controller may select different array antenna indexes through transmission signals are radiated according to respective detection modes and the array antennas may be disposed to have different heights in a direction perpendicular to the ground.

Figure 14:
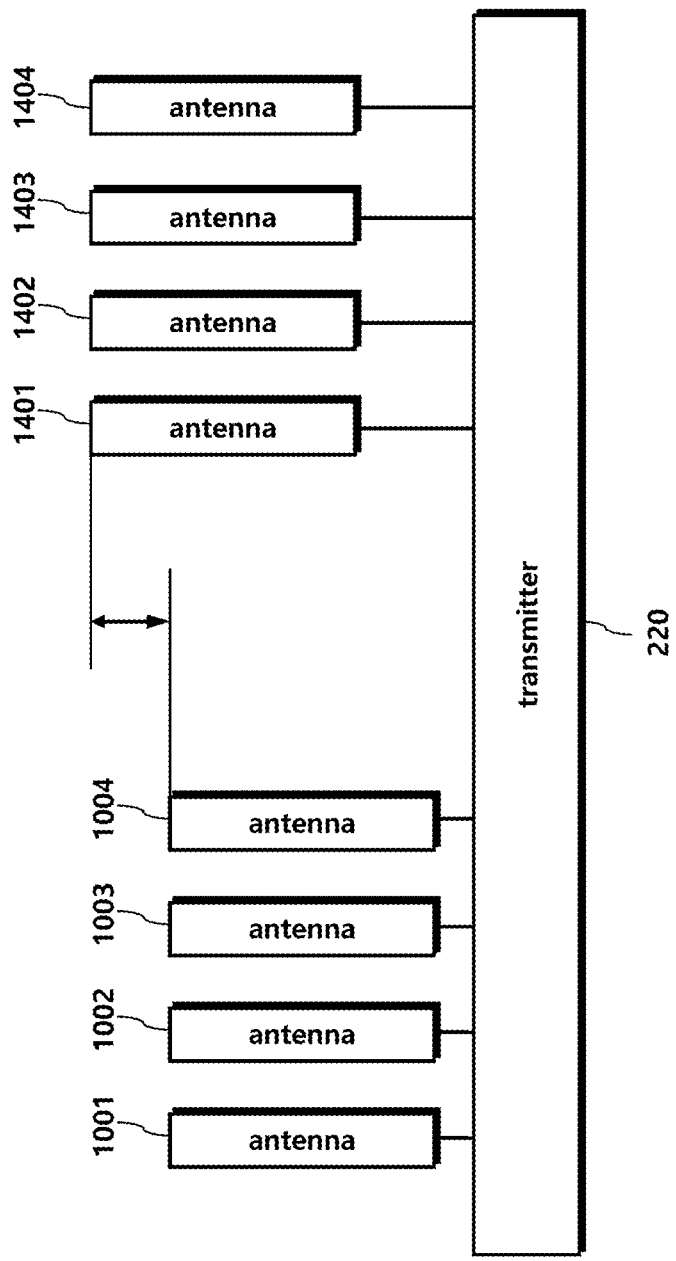
FIGS. 14 and 15 illustrate array antennas disposed to have different heights in the direction perpendicular to the ground in order to radiate transmission signals at different transmission angles according to an embodiment.
Figure 15:
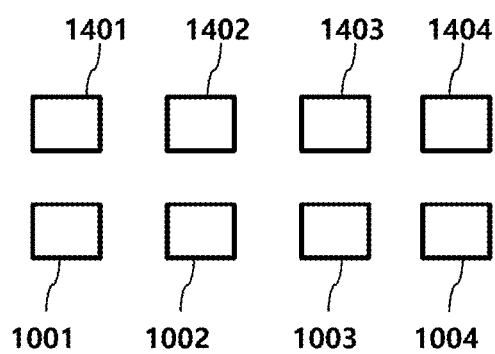

FIGS. 14 and 15 illustrate array antennas disposed to have different heights in the direction perpendicular to the ground in order to radiate transmission signals at different transmission angles according to an embodiment of the present disclosure.

Referring to FIG. 14, array antennas disposed to have different heights in the direction perpendicular to the ground may include first vertical angle array antennas 1401 to 1404 disposed to have heights 1001 to 1004 and second vertical angle array antennas disposed to have heights 1401 to 1404. That is, the first vertical angle array antennas may have a height difference from the second vertical angle array antennas. However, lengths of the first vertical angle array antennas and the second vertical angle array antennas may be the same as each other.

Although FIG. 14 illustrates the structure in which the first vertical angle array antennas and the second vertical angle array antennas are separately disposed on the same plane, the first vertical angle array antennas and the second vertical angle array antennas may be configured back and forth as illustrated in FIG. 15.

FIG. 15 is a top view of a substrate on which array antennas are disposed, and the first vertical angle array antennas and the second vertical angle array antennas may be configured on the same plane in a depth direction.

As described above, in the array antennas disposed to have different heights, when the apparatus for controlling the radar radiates transmission signals at a first time through the first vertical angle array antennas and radiates transmission signals at a second time through the second vertical angle array antennas, the transmission signals may be radiated at different angles as illustrated in FIG. 13.

In further consideration of the detection distance and the vertical detection angle described above by way an example, the apparatus for controlling the radar may select all the antennas 1001 to 1004 to have the LRR detection distance and transmit first transmission signals at the first time. Thereafter, the apparatus for controlling the radar may select the antenna 1001 to have the SRR detection distance and transmit second transmission signals at the second time. Thereafter, the apparatus for controlling the radar may select all the antennas 1401 to 1404 and transmit third transmission signals at a third time to have the LRR detection distance but form a vertical detection angle different from that of the first transmission signals and may select the antenna 1401 and transmit fourth transmission signals at a fourth time to have the SRR detection distance and form a vertical detection angle different from that of the second transmission signals.

As described above, the apparatus for controlling the radar may configure a plurality of detection modes in consideration of three factors, such as the detection distance, the horizontal detection angle, and the vertical detection angle, and may determine transmission patterns divided according to setting sequences and setting frequencies of respective detection modes.

Figure 16:
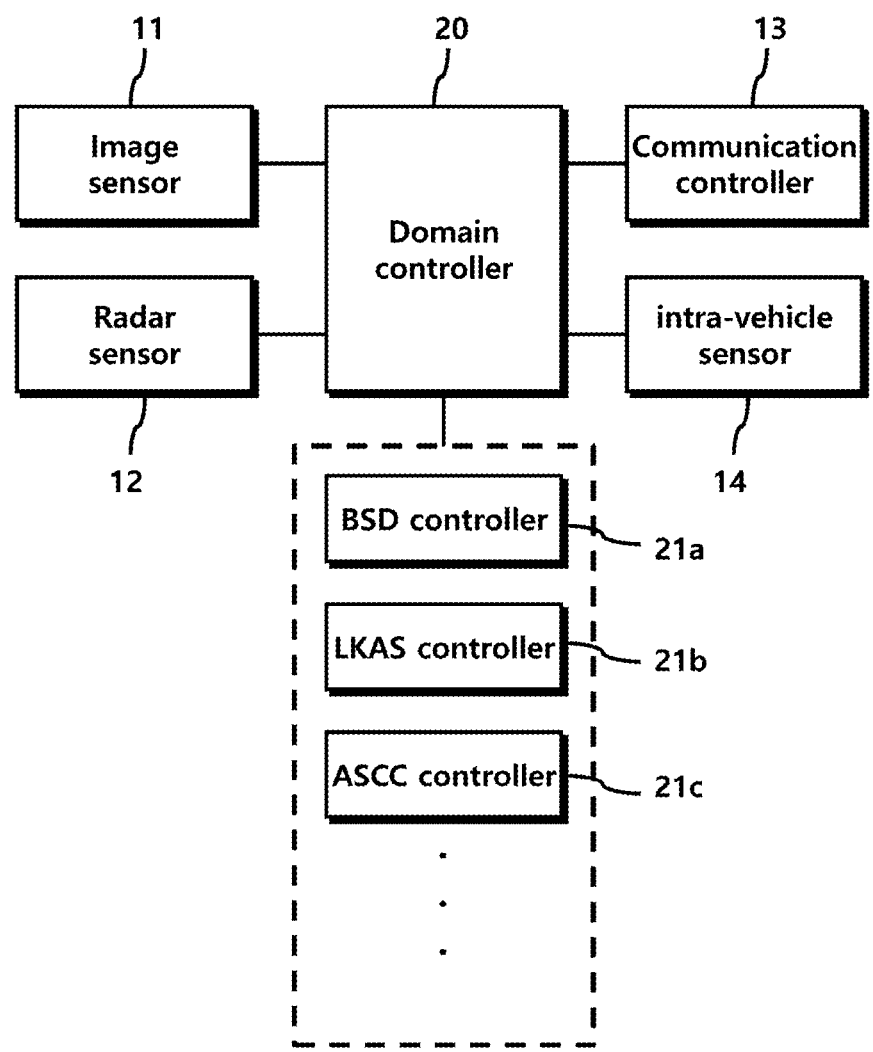
FIG. 16 is a block diagram illustrating a system for controlling a radar according to an embodiment.

FIG. 16 is a block diagram illustrating a system for controlling a radar according to an embodiment.

Referring to FIG. 16, the system for controlling the radar may include at least one radar sensor 12 mounted to a vehicle to have an sensing area of an interior or an exterior of the vehicle and configured to capture sensing data, at least one driver assistance system controller 21 mounted to the vehicle and configured to output a control signal for performing a driving assistance function, and a domain controller 20 configured to process the sensing data and control the at least one driver assistance system controller. The domain controller 20 may detect targets around the vehicle using the sensing data, classify the detected targets, set a transmission pattern of transmission signals based on at least one piece of detection distance information of the detected targets, detection location information, detection height information, and information on a number of detected targets, select at least one array antenna from a plurality of array antennas according to the transmission pattern, and control the radar sensor 12 to radiate the transmission signals through the selected array antenna.

Meanwhile, the vehicle may include a domain controller 20, a image sensor 11, a radar sensor 12, a communication controller 13, and an intra-vehicle sensor 14.

The image sensor 11 may include an image sensor configured to have a field of view of an interior or an exterior of the vehicle and capture image data, and a processor configured to process the captured image data.

For example, the image sensor may be mounted to the vehicle to have a field of view of an interior or an exterior of the vehicle. At least one image sensor may be mounted to each part of the vehicle to have a field of view of the front, side, or rear of the vehicle.

Information on an image photographed by the image sensor consists of image data and thus may refer to image data captured by the image sensor. Hereinafter, information on an image taken by the image sensor in the present disclosure means image data captured by the image sensor. The image data captured by the image sensor may be generated, for example, in one format of AVI, MPEG-4, H.264, DivX, and JPEG in a raw form.

The image data captured by the image sensor may be processed by a processor. The processor may operate to process the image data captured by the image sensor.

The processor may implemented using at least one of electrical units for processing image data and performing other functions, such as Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, micro-processors, in hardware.

Meanwhile, the radar sensor 12 is a sensor module other than the image sensor 11 for capturing an image. For example, a plurality of radar sensors 12 may be mounted to the vehicle to have a sensing area of an interior or an exterior of the vehicle and configured to capture sensing data. The plurality of radar sensors 12 may include, for example, radar sensors, lidar sensors, and ultrasonic sensors.

The communication controller 13 performs a function of performing communication between vehicles, communication between a vehicle and infrastructure, communication between a vehicle and a server, and communication inside a vehicle. To this end, the communication controller 13 may consist of a transmission module and a reception module. For example, the communication controller 13 may include a broadcast reception module, a wireless Internet module, a short-range communication controller, a location information module, an optical communication controller, and a V2X communication controller.

The intra-vehicle sensor 14 of the vehicle is a sensor for sensing internal information of the vehicle. For example, the intra-vehicle sensor 14 may be a torque sensor for sensing a steering torque, a steering angle sensor for sensing a steering angle, a motor location sensor for sensing information on a steering motor, a vehicle speed sensor, a vehicle motion detection sensor for sensing motion of the vehicle, and a vehicle position detection sensor. Furthermore, the intra-vehicle sensor 14 may be a sensor for sensing various pieces of data inside the vehicle and the number of thereof may be one or more.

The Domain controller (DCU) 20 may be configured to receive sensing data captured by at least one non-image sensor and process the sensing data. For such processing, the domain controller 20 may include at least one processor.

Alternatively, the domain controller 20 may transmit and receive data to and from at least one of the image sensor 11, the radar sensor 12, the communication controller 13, the intra-vehicle sensor 14, and the driver assistance system controller 21, or process the data received therethrough. That is, the domain controller 20 may be located within the vehicle and communicate with at least one module mounted within the vehicle. To this end, the domain controller 20 may further include an appropriate data link or communication link such as a vehicle network bus for data transmission or signal communication.

The domain controller 20 may operate to control one or more of various driver assistance systems (DAS) used by the vehicle. For example, the domain controller 20 may determine a particular situation, a condition, event generation, and control operation performance based on data acquired from at least one of the modules 11, 12, 13, 14, or 21.

The domain controller 20 may transmit a signal for controlling the operation of the various driver assistance system controller 21 included in the vehicle based on determined information. For example, the driver assistance system controller 21 may include a blind spot detection (BSD) system controller 21a, a lane keeping assist system (LKAS) controller 21b, and an adaptive smart cruise control (ASCC) system controller 21c. In addition, the driver assistance system controllers 21 included in the vehicle may be one of various systems, such as a lane departure warning system (LDWS), a lane change assist system (LCAS), a parking assist system (PAS). The terms and names of the driver assistance systems described herein are only for examples and are not limited thereto. The driver assistance system controller 21 may include an autonomous driving module for autonomous driving. Alternatively, the domain controller may control the vehicle to perform autonomous driving by controlling individual system controllers included in the driver assistance system controller 21.

Meanwhile, the domain controller 20 according to the present disclosure may receive sensing data from the radar sensor 12, detect targets around the vehicle based on the sensing data, classify the detected targets, and set a transmission pattern of the transmission signals based on at least one piece of detection distance information of the detected target, detection location information, detection height information, and information on the number of detected targets. The domain controller 20 may select at least one array antenna from a plurality of array antennas according to the transmission pattern and control the radar sensor to radiate the transmission signals through the selected array antenna.

The domain controller 20 sets a transmission pattern to include a plurality of detection modes divided according to at least one of a distance, a height, or an angle for detecting targets. The transmission pattern may be divided based on at least one of sequences in which a plurality of detection modes is set or a frequency in which each of a plurality of detection modes is set.

As described above, the present disclosure provides an effect of dynamically controlling the radar operation according to surroundings of the vehicle. Further, the present disclosure has an effect of improving the radar detection performance and preventing unnecessary power waste by dynamically controlling the radar device as needed.

The present embodiments may be implemented through various means. For example, the present embodiments may be implemented by hardware, firmware, software, or a combination thereof.

In implementation by hardware, the present embodiments may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), a processor, a controller, a microcontroller, and a microprocessor.

In implementation by firmware or software, the present embodiments may be implemented in the form of a device, a procedure, or a function for performing the functions or operations described above. A software code may be stored in a memory unit and executed by the processor. The memory unit may be located inside or outside the processor and exchange data with the processor by various known means.

The terms, "system", "processor", "controller", "component", "module", "interface", "model", and "unit" may generally refer to computer-related entity hardware, a combination of hardware and software, software, or software being executed. For example, the above-described elements may be a process executed by a processor, a processor, a controller, a control processor, an entity, an executed thread, a program, and/or a computer, but are not limited thereto. For example, all of an application executed by a controller or a processor, the controller, or the processor may be elements. One or more elements may be within a process and/or an executed thread, and may be located in one system or distributed to two or more systems.

Even if it was described above that all of the components of an embodiment of the present disclosure are coupled as a single unit or coupled to be operated as a single unit, the present disclosure is not necessarily limited to such an embodiment. That is, at least two elements of all structural elements may be selectively joined and operate without departing from the scope of the present disclosure. The above embodiments of the present disclosure have been described only for illustrative purposes, and those skilled in the art will appreciate that various modifications and changes may be made thereto without departing from the scope and spirit of the disclosure. The scope of the present disclosure shall be construed based on the accompanying claims in such a manner that all of the technical ideas included within the scope equivalent to the claims belong to the present disclosure.

What is claimed is:

1. An apparatus for controlling a radar, the apparatus comprising:
   a target detector configured to detect targets around a vehicle and classify the detected targets;
   a transmission pattern setter configured to set a transmission pattern of transmission signals, based on at least one piece of detection distance information of the detected targets, detection location information, detection height information, or information on the number of detected targets; and a transmission signal controller configured to select at least one array antenna from a plurality of array antennas according to the transmission pattern and radiate the transmission signals through the selected array antenna, wherein the transmission pattern is set to comprise a plurality of detection modes divided according to a distance and an angle for detecting the targets, and the transmission pattern comprises a reference transmission pattern including each of the plurality of detection modes once, and wherein the transmission pattern setter is configured to set the other transmission pattern so that the other transmission pattern includes at least two or more detection modes among the plurality of detection modes and at least one of an order and a number of times in which the two or more detection modes are set is different from at least one of an order and a number of times in which the reference transmission pattern including each of the plurality of detection modes once is set.

2. The apparatus of claim 1, wherein the target detector classifies the detected targets into control targets for controlling the vehicle and peripheral targets according to a control mode of the vehicle.

3. The apparatus of claim 1, wherein the transmission pattern setter determines a maximum detection distance from detection distance information between each of the detected targets and the vehicle and sets a transmission pattern corresponding to the maximum detection distance.

4. The apparatus of claim 1, wherein the transmission pattern setter determines a maximum angle at which the detected targets are distributed from the vehicle, based on the detection location information and sets a transmission pattern corresponding to the maximum angle.

5. The apparatus of claim 1, wherein the transmission pattern setter compares the number of detected targets with preset reference number and sets a transmission pattern based on the comparison result.

6. The apparatus of claim 1, wherein the transmission pattern setter sets a transmission pattern corresponding to the detection height information using the detection height information of the detected targets.

7. The apparatus of claim 1, wherein the transmission pattern is divided according to at least one of sequence in which the plurality of detection modes are set or a frequency in which each of the plurality of detection modes is set.

8. The apparatus of claim 7, wherein the transmission pattern setter periodically sets the reference transmission pattern in which each of the plurality of detection modes appears once according to a preset period.

9. The apparatus of claim 7, wherein the transmission signal controller determines the number of array antennas through which the transmission signals are radiated according to each of the detection modes.

10. The apparatus of claim 7, wherein the transmission signal controller determines the number of array antennas according to the detection modes included in the transmission pattern and selects an index of the array antenna according to the detection location information of the targets.

11. The apparatus of claim 1, wherein the transmission pattern is set to comprise all of a plurality of detection modes divided according to a transmission angle for detecting the targets, and is divided, based on at least one of a sequence in which the plurality of detection modes is set or a frequency in which each of the plurality of detection modes is set.

12. The apparatus of claim 11, wherein the transmission signal controller selects array antenna indexes through which the transmission signals are radiated according to each of the detection modes, and the array antennas are disposed to have different heights in a direction perpendicular to the ground.

13. A method of controlling a radar, the method comprising:

detecting targets around a vehicle and classifying the detected targets;

setting a transmission pattern of transmission signals, based on at least one piece of detection distance information of the detected targets, detection location information, detection height information, or information on the number of detected targets; and selecting at least one array antenna from a plurality of array antennas according to the transmission pattern and radiating the transmission signals through the selected array antenna, wherein the transmission pattern is set to comprise a plurality of detection modes divided according to a distance and an angle for detecting the targets, and the transmission pattern comprises a reference transmission pattern including each of the plurality of detection modes once, and wherein the setting comprises setting the other transmission pattern so that the other transmission pattern includes at least two or more detection modes among the plurality of detection modes and at least one of an order and a number of times in which the two or more detection modes are set is different from at least one of an order and a number of times in which the reference transmission pattern including each of the plurality of detection modes once is set.

14. The method of claim 13, wherein setting the transmission pattern of transmission signals comprises determining a maximum detection distance from detection distance information between each of the detected target and the vehicle and setting a transmission pattern corresponding to the maximum detection distance.

15. The method of claim 13, wherein setting the transmission pattern of transmission signals comprises periodically setting the reference transmission pattern in which each of a plurality of detection modes, which is divided according to a distance and an angle for detecting the targets, appears once according to a preset period.

16. The method of claim 15, wherein selecting the at least one array antenna comprises determining the number of array antennas through which the transmission signals are radiated according to each of the detection modes.

17. The method of claim 13, wherein the transmission pattern is set to comprise all of a plurality of detection modes divided according to a transmission angle for detecting the targets and is divided, based on at least one of a sequence in which the plurality of detection modes are set or a frequency in which each of the plurality of detection modes is set.

18. The method of claim 17, wherein selecting the at least one array antenna comprises selecting array antenna indexes through which the transmission signals are radiated according to each of the detection modes, and the array antennas are disposed to have different heights in a direction perpendicular to the ground.

19. A system for controlling a radar, the system comprising:

at least one radar sensor mounted to a vehicle to have a sensing area of an interior or an exterior of the vehicle and configured to capture sensing data, at least one driver assistance system controller mounted to the vehicle and configured to output a control signal for performing a driving assistance function; and a domain controller configured to process the sensing data and control the at least one driver assistance system controller, wherein the domain controller is configured to:

detect targets around the vehicle using the sensing data and classify the detected targets;

set a transmission pattern of transmission signals, based on at least one piece of detection distance information of the detected targets, detection location information, detection height information, or information on the number of detected targets, and select at least one array antenna from a plurality of array antennas according to the transmission pattern and control the radar sensor to radiate the transmission signals through the selected array antenna, wherein the transmission pattern is set to comprise a plurality of detection modes divided according to a distance and an angle for detecting the targets, and the transmission pattern comprises a reference transmission pattern including each of the plurality of detection modes once, wherein the domain controller is configured to set the other transmission pattern so that the other transmission pattern includes at least two or more detection modes among the plurality of detection modes and at least one of an order and a number of times in which the two or more detection modes are set is different from at least one of an order and a number of times in which the reference transmission pattern including each of the plurality of detection modes once is set.

* * * * *